(12) United States Patent
Prasad et al.

(10) Patent No.: US 8,290,273 B2
(45) Date of Patent: Oct. 16, 2012

(54) MULTI-FRAME VIDEOTEXT RECOGNITION

(75) Inventors: Rohit Prasad, Acton, MA (US); Premkumar Natarajan, Sudbury, MA (US); Ehry MacRostie, Watertown, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 820 days.

(21) Appl. No.: 12/413,048

(22) Filed: Mar. 27, 2009

(65) Prior Publication Data
US 2010/0246961 A1 Sep. 30, 2010

(51) Int. Cl.
*G06K 9/00* (2006.01)
*G10L 15/04* (2006.01)
(52) U.S. Cl. ......................................... 382/181; 704/251
(58) Field of Classification Search .......... 382/181–186, 382/228, 229, 231, 292, 305, 312; 704/251
See application file for complete search history.

(56) References Cited

U.S. PATENT DOCUMENTS

| | | | | |
|---|---|---|---|---|
| 5,754,695 A * | 5/1998 | Kuo et al. | | 382/228 |
| 7,499,588 B2 * | 3/2009 | Jacobs et al. | | 382/182 |
| 7,809,722 B2 * | 10/2010 | Gokturk et al. | | 707/736 |
| 7,840,400 B2 * | 11/2010 | Lavi et al. | | 704/9 |
| 8,036,878 B2 * | 10/2011 | Assadollahi | | 704/10 |
| 8,041,566 B2 * | 10/2011 | Peters et al. | | 704/236 |
| 2006/0047704 A1 | 3/2006 | Gopalakrishnan | | |
| 2006/0182311 A1 | 8/2006 | Lev | | |
| 2007/0211942 A1 | 9/2007 | Curtis et al. | | |
| 2008/0002914 A1 | 1/2008 | Vincent et al. | | |

FOREIGN PATENT DOCUMENTS

WO  WO 2006/036442  4/2006
WO  WO 2007/103984  9/2007

OTHER PUBLICATIONS

Prasad et al., "Multi-Frame Combination for Robust Videotext Recognition," IEEE 2008, pp. 1357-1360.

* cited by examiner

*Primary Examiner* — Kanjibhai Patel
(74) *Attorney, Agent, or Firm* — Occhiuti Rohlicek & Tsao LLP

(57) ABSTRACT

Multi-frame persistence of videotext is exploited to mitigate challenges posed by varying characteristics of videotext across frame instances to improve OCR techniques. In some examples, each frame of video is processed to form multiple binary images, and one or more text hypotheses is formed from each binary image. In some examples, one or more combined images are formed from multiple frames processed to form a binary image and a corresponding text hypothesis. The text hypotheses are combined to yield an overall text recognition output.

20 Claims, 3 Drawing Sheets

MULTI-FRAME VIDEOTEXT RECOGNITION

STATEMENT AS TO FEDERALLY-SPONSORED RESEARCH

This invention was made with government support under contract NBCHC060155. The government has certain rights in the invention.

BACKGROUND

This description relates to text recognition in video images.

An increase of multimedia content, especially in the form of archived or streaming videos, has resulted in a critical need for indexing and archiving such content. While much of the information in video, such as Broadcast News (BN) video, can be in the visuals (faces, scenes, etc.) and the audio, additional information can be present in text form either as overlaid text that describes the scene or scene text that appears as part of the scene.

Optical Character Recognition (OCR) of overlaid text in video streams can be a challenging problem due to various factors including the presence of dynamic backgrounds, color, and low resolution. In video feeds such as Broadcast News (BN), a particular overlaid text usually persists for multiple frames during which the background may or may not vary. OCR of scene text can involve further challenges, for example, resulting from changes of point of view and illumination.

SUMMARY

In general, in an aspect, multi-frame persistence of videotext is exploited to mitigate challenges posed by varying characteristics of videotext across frame instances to improve OCR techniques.

In general, in an aspect, a method is directed to recognizing text from a video signal. A sequence of input images is formed from the video signal, at least some of the input images including an image representing text. The sequence of input images is combined to form one or more combined images. A plurality of processed images is formed, including processing input images to form at least some of the processed images and processing the one or more combined images to form at least one of the processed images. One or more text hypotheses are generated for each of a plurality of processed images. A combined text output is determined from a combination of the generated text hypotheses.

Implementations may include one or more of the following features.

The method includes accepting a sequence of video frames of the video signal and accepting a specification of a bounding region and a time interface of an instance of text represented in the video signal, and forming a sequence of images from the video signal. Forming the sequence of images includes forming the images from the sequence of video frames according to the specification of the bounding region and the time interval.

Combining the sequence of images includes registering images from the sequence of images and combining the registered images.

Combining the sequence of images includes determining an extremum image. Determining the extremum image may also include determining an extremum intensity value at locations over input images.

Forming the plurality of processed images includes forming binary images from the input images and the one or more combined images. Forming a binary image from an input image includes comparing intensity values at locations in the input image with a threshold intensity.

Forming the plurality of processed images includes, for each input image, forming a plurality of processed images, each of said processed images being formed using a different processing of the input image.

Generating the one or more text hypotheses for each of the plurality of processed images includes applying a statistical character recognizer to each of the processed images. Forming the plurality of processed images may also include, for each input image, forming a plurality of processed images, each of said processed images being formed using a different processing of the input image, and applying the statistical character recognizer to each of the processed images includes configuring the recognizer according to parameters matching the different processing applied to form the processed images.

Generating the one or more text hypotheses for each of the plurality of processed images includes generating multiple best character sequences.

Determining the combined text output includes aligning character sequence hypotheses of the generated text hypotheses. Aligning the character sequences may also include applying a spatial limit to the alignment of characters of different sequences.

Determining the combined text output from the combination of the generated text hypotheses includes forming a network representation of the text hypotheses and determining the combined text output using the network representation.

In general, in an aspect, a method is directed to text recognition from a video signal. The method includes forming a sequence of input images from the video signal, at least some of the input images including an image representing text. The method includes combining the sequence of input images to form one or more combined images, wherein one of the combined images is an extremum image. The method includes forming a plurality of processed images, including processing input images to form at least some of the processed images and processing the one or more combined images to form at least one of the processed images. The method includes forming a plurality of processed images, including, for each input image, forming a plurality of processed images, each of said processed images being formed using a different processing of the input image. The method includes applying a statistical character recognizer to each of the processed image includes configuring the recognizer according to parameters matching the different processing applied to form the processed images. The method includes generating one or more text hypotheses for each of the plurality of processed images. The method includes determining a combined text output from a combination of the generated text hypotheses by forming a network representation of the text hypotheses and determining the combined text output using the network representation.

In general, in an aspect, a system is directed to text recognition from a video signal. The system includes an image combiner configured to accept a sequence of input images and provide a combined image formed from the input images. The system includes an image processor block, configured to accept the sequence of input images from the video signal and to accept the combined image from the image combiner. The system includes a text recognizer coupled to the image processor block for generating a text hypothesis for each of a plurality of processed images. The system includes an output estimator coupled to the text recognizer for determining a combined text output from a combination of the generated text hypotheses.

Implementations may include one or more of the following features.

The image combiner is configured to accept a sequence of input images and provide an extremum image that has extremum intensity values at locations over the input images.

An output estimator is coupled to the text recognizer for determining a combined text output from a combination of the generated text hypotheses by forming a network representation of the text hypotheses and determining the combined text output using the network representation.

In general, in an aspect, software is stored on a computer-readable medium including instructions for causing a data processing system to form a sequence of input images from a video signal, at least some of the input images including an image representing text; combine the sequence of input images to form one or more combined images; form a plurality of processed images, including processing input images to form at least some of the processed images and processing the combined image to form at least one of the processed images; generate one or more text hypotheses for each of a plurality of processed images; and determine a combined text output from a combination of the generated text hypotheses.

Implementations may include one or more of the following features.

The software includes instructions for causing a data processing system to combine the sequence of input images to form one or more combined images, wherein one of the combined images is an extremum image that has extremum intensity values at locations over the input images. The software includes instructions for causing a data processing system to form a plurality of processed images, including processing input images to form at least some of the processed images and processing the one or more combined images to form at least one of the processed images. The software includes instructions for causing a data processing system to form a plurality of processed images, including, for each input image, forming a plurality of processed images, each of said processed images being formed using a different processing of the input image, and applying a statistical character recognizer to each of the processed image includes configuring the recognizer according to parameters matching the different processing applied to form the processed images. The software includes instructions for causing a data processing system to determine a combined text output from a combination of the generated text hypotheses by forming a network representation of the text hypotheses and determining the combined text output using the network representation.

Advantages include improved Optical Character Recognition (OCR) of text in video streams, for example, as measured by a word error rate (WER).

Other features and advantages of the invention are apparent from the following description, and from the claims.

DESCRIPTION

Figure 1:
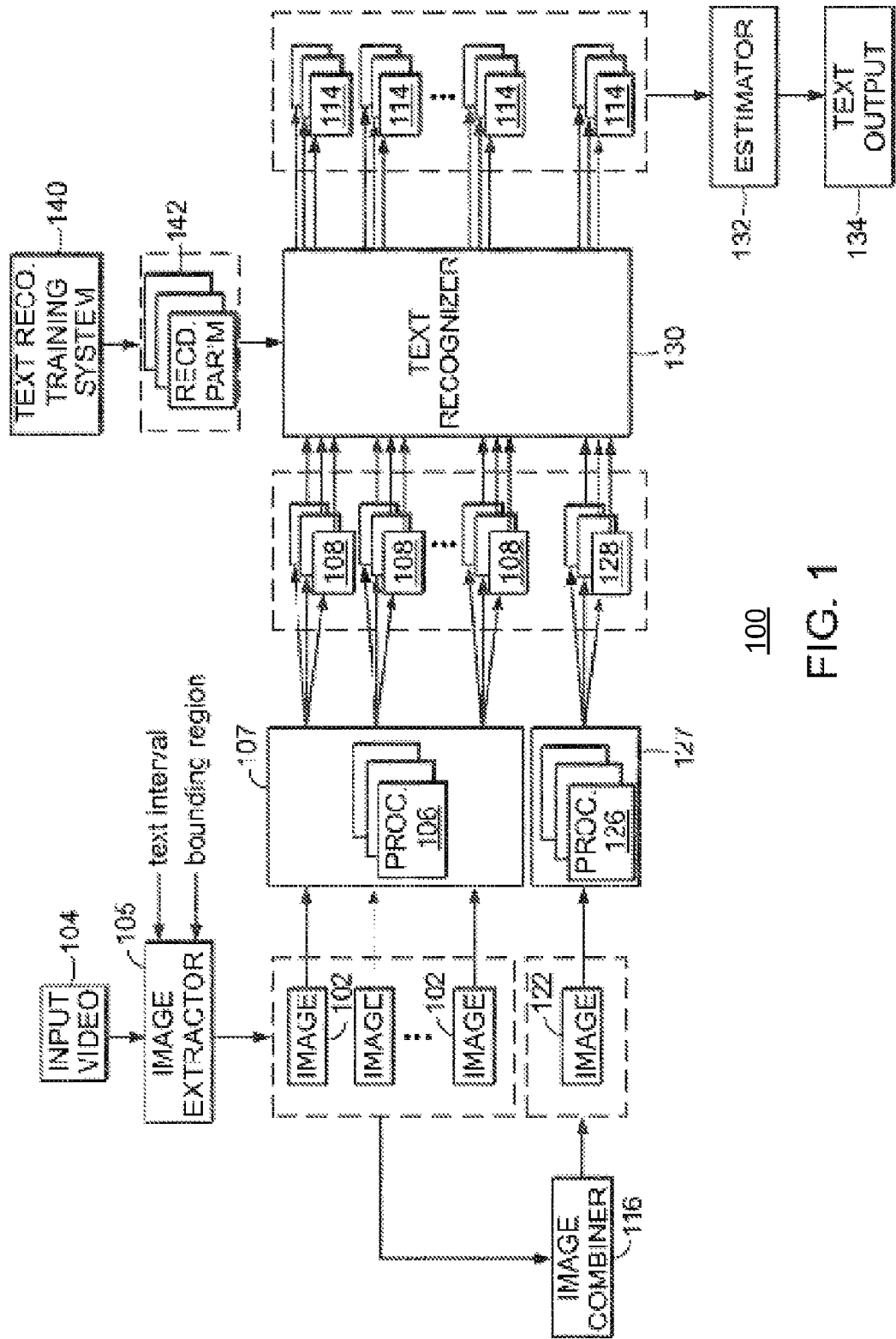
FIG. 1 is a videotext OCR system.

Referring to FIG. 1, an example of a videotext OCR system 100 processes video input 104 and produces a text output 134 that represents an estimate of text that is present for some time interval of the video signal. In various examples, the text may be printed, handwritten and/or script text. The image representation of the text may differ from frame to frame of the video signal, for example, due to a change in illumination, in camera angle, or in location of a text region (e.g., as defined by a bounding box).

Generally, the videotext OCR system 100 extracts images 102 corresponding to frames of the video input 104. The videotext OCR system 100 processes these images, individually, in combination, or both, to produce multiple binary images 108, 128, and generates a text hypothesis 114 for each binary image. The multiple text hypotheses 114 are then combined to form an overall recognized text output 134, which represents an estimate of the text that is present in the extracted images.

The videotext OCR system 100 applies an image extractor 105 to the video input 104 to produce the multiple images 102. In some examples, the image extractor 105 receives an input that specifies a time interval and a bounding region of the text in the frames, and extracts a portion of each of a number of frames in the time interval to form the corresponding image 102. In some examples, bounding region and the time interval are selected manually, for example, by a user placing a bounding box around text in a frame of the video. In some examples, an automated or semi-automated procedure is used to detect text in the input video and compute the time interval and bounding region for such detected text. For example, text detection techniques can be used that are described in T. Sato et al., "Video OCR: Indexing Digital News Libraries by Recognition of Superimposed Caption," *ACM Multimedia Systems Special Issue on Video Libraries*, 7(5): 385-395, 1999, or P. Natarajan, et al., "Videotext OCR using Hidden Markov Models," *Proceedings Sixth International Conference on Document Analysis and Recognition*, 947-951, Seattle, Wash., 2001, both of which are incorporated by reference here. Alternatively or in addition, a heuristic-based approach can be used to determine all positions in which a text region can occur.

In some examples, the input video 104 is a compressed signal, e.g., a JPEG video signal. The images 102 can correspond to various types of frames, e.g., an intra-coded picture or "I-frame," a predicted picture or "P-frame" or "delta frame," and a bi-predictive picture or "B-frame." An I-frame is a fully-specified picture, while P- and B-frames specify only part of the image information (a P-frame specifies only the changes in an image from the previous frame and a B-frame specifies differences between the current image and both the preceding and following frames). In some examples, each I-frame is used to form one of the images 102. In other examples, predicted frames are used to form some of the images 102 and I frames are used to form some of the images 102.

As shown in FIG. 1, the input images 102 are processed by a processing block 107 to produce multiple binary images 108. Each binary image 108 is processed by a text recognizer 130 to yield a corresponding text hypothesis 114. The multiple text hypotheses 114 contribute to the estimation of the text output 134, which is computed by an estimator 132.

In general, the processing block 107 includes a number of processors 106, each of which performs a different transformation of an input image 102 to produce a binary image 108. In some examples, each input image 102 is processed by each processor 106. That is, in an example as illustrated in which there are three processors 106, each input image produces three binary images 108. In some examples, each processor 106 uses a same processing procedure but is configured with different parameters. In some examples, different processing procedures are used. One specific example of a processor is used to binarize an image at a particular intensity threshold such that any pixel value of the input image that has an intensity above a threshold value is replaced with a value that represents white; any pixel value that is below the threshold, black. Alternatively, pixel values that are above the threshold can be set to black and pixel values below the threshold can be set to white. In various examples of binarization processors, the thresholds applied by the processors 106 are specified as percentile values on image intensity, as levels relative to other statistics (e.g., average intensity) of the image, or set to absolute levels. The specification of the particular thresholds for the processors may be set heuristically, for example, using percentile thresholds of 60, 75, and 90.

In some examples, a processor 106 applies additional transformations to the image before and/or after conversion to a binary image. Such additional processing may include, as examples, one or more of upsampling, color transformation or filtering, spatial filtering, averaging, and deskewing. In some examples, upsampling is performed prior to conversion to a binary image to mitigate the effect of low resolution of videotext. In some examples, the upsampling is according to fixed factor (e.g., two, four, five, six, ten).

In some examples, the videotext OCR system 100 includes an image combiner 116, which combines multiple input images 102 to form one or more combined images 122. Each combined image 122 is processed by a processor block 127, which includes one or more processors 126, to form corresponding binary images 128. In some examples, the processors 126 are the same as the processors 106. Each binary image 128 is processed by a text recognizer 130 to yield a corresponding text hypothesis 114. The multiple text hypotheses 114 determined from the binary images 128 contribute to the estimation of the text output 134, which is computed by an estimator 132. That is, the estimator combines text hypotheses that correspond to individual images 102 and text hypotheses that correspond to combined images 122 to form the overall recognized text output 134.

A relevant property of overlaid videotext is that the text often remains relatively constant in appearance over a few frames, while the background varies. This characteristic can be leveraged for improving the quality of the images and the quality of the OCR. In some examples, the image combiner 116 receives multiple images that each contains light text on a dark background (or dark text on a light background). The image combiner 116 registers (e.g., aligns, and optionally deskews or otherwise transforms) the text regions within these images. In some examples, scene text is observed in multiple frames of a video signal and the image combiner registers the text regions within these images to account for changes in perspective, distortions, or other differences in the appearance of text. The combiner 116 then uses the registered images to compute the combined image 122 by taking the minimum intensity value across a number of instances of the text region for light text on a dark background (or the maximum intensity for dark text on a light background). This combined image 122 has an enhanced contrast and can be referred to as a "min-image" (or a "max-image," if dark text on a light background is used). In some examples, multiple combined images 122 are formed, each according to a different combination procedure.

Each binary image 108, 128 is passed to a text recognizer 130, which produces a corresponding text hypothesis 114. In some examples, the text hypothesis includes a character sequence, for example, forming one or more words, that best represents the text content of the binary image. In some examples, the text hypothesis further includes information associating each recognized character with a location in the binary image. In some examples, each text hypothesis 114 includes an N-best list of character sequences, each associated with a rank and/or a score representing the quality of the match between the hypothesized sequence of characters and the binary image processed by the text recognizer 130.

In some examples, the text recognizer 130 of the videotext OCR system 100 uses a hidden Markov model (HMM) technique (e.g., the BBN Byblos developed for recognizing text in printed documents, as described in P. Natarajan, et al., "Multilingual Machine Printed OCR," International Journal Pattern Recognition and Artificial Intelligence, Special Issue on Hidden Markov Models in Vision, pp. 43-63, 2001, which is incorporated by reference here). The recognizer uses recognition parameters 142, which includes parameters estimated by a text recognition training system 140. In some examples, the binary images 108, 128 produced by different processors 106, 126 have different properties, and different corresponding sets of recognition parameters 142 are used to configure the text recognizer 130 depending on the binary image being processed.

An estimator 132 receives the multiple text hypotheses 114 and produces an overall text output 134. In some examples, the input hypotheses are combined using at least one of a voting technique, a weighted voting technique, or a Bayesian combination technique. In some examples, the estimator 132 uses the NIST Recognizer Output Voting Error Reduction (ROVER) technique (see, e.g., J. Fiscus, "A Post-Processing System to Yield Reduced Word Error Rates: Recognizer Output Voting Error Reduction (ROVER)," *Proceedings IEEE Workshop on Automatic Speech Recognition and Understanding*, Santa Barbara, Calif., 1997, which is incorporated by reference here).

In an example of a ROVER technique, the estimator 132 aligns multiple character sequences represented by the hypotheses 114 (e.g., one character sequence per hypothesis 114 in the case of 1-best output from the text recognizer, or N character sequences per hypothesis 114 for N-best output) using a dynamic programming (DP) approach. The aligned character sequences are then combined by the estimator to form a class transition network such that each character sequence of a text hypothesis 114 corresponds to at least one path through the network. In alternative examples, rather than aligning characters, the alignment may be in terms of larger units, such as words. The following description focuses on characters, but words or sentences could be used alternatively or in addition.

In some examples, the estimator 132 uses the association of each recognized character with a location in the binary image used to generate the corresponding hypothesis to constrain alignment to a maximum spatial displacement between aligned characters of different character sequences. Adjacent characters in the transition network are connected by links. The estimator 132 evaluates each branching point in the network that connects one character with a multiple other characters using a voting mechanism (e.g., the NIST ROVER technique) to select a best link from that point, for example, based on the number (or a weighted number) of uses of each link in the character sequences used to construct the network. The link with highest number of votes is selected and the corresponding linked character is chosen as the best-scoring character. A sequence of best-scoring characters is formed by piecing together the best scoring characters selected from each branching point within the text region. In addition, confidence scores can be used for each character in the voting process. In some examples, the estimator 132 produces multiple ranked outputs, for example, based on the transition network. As an example, if there are initially M images 102, one combined image 122, K processors 106 or 126, and N best character sequences per hypothesis, the estimator 132 combines a total of (M+1)*K*N character sequences in forming the transition network.

Figure 2:
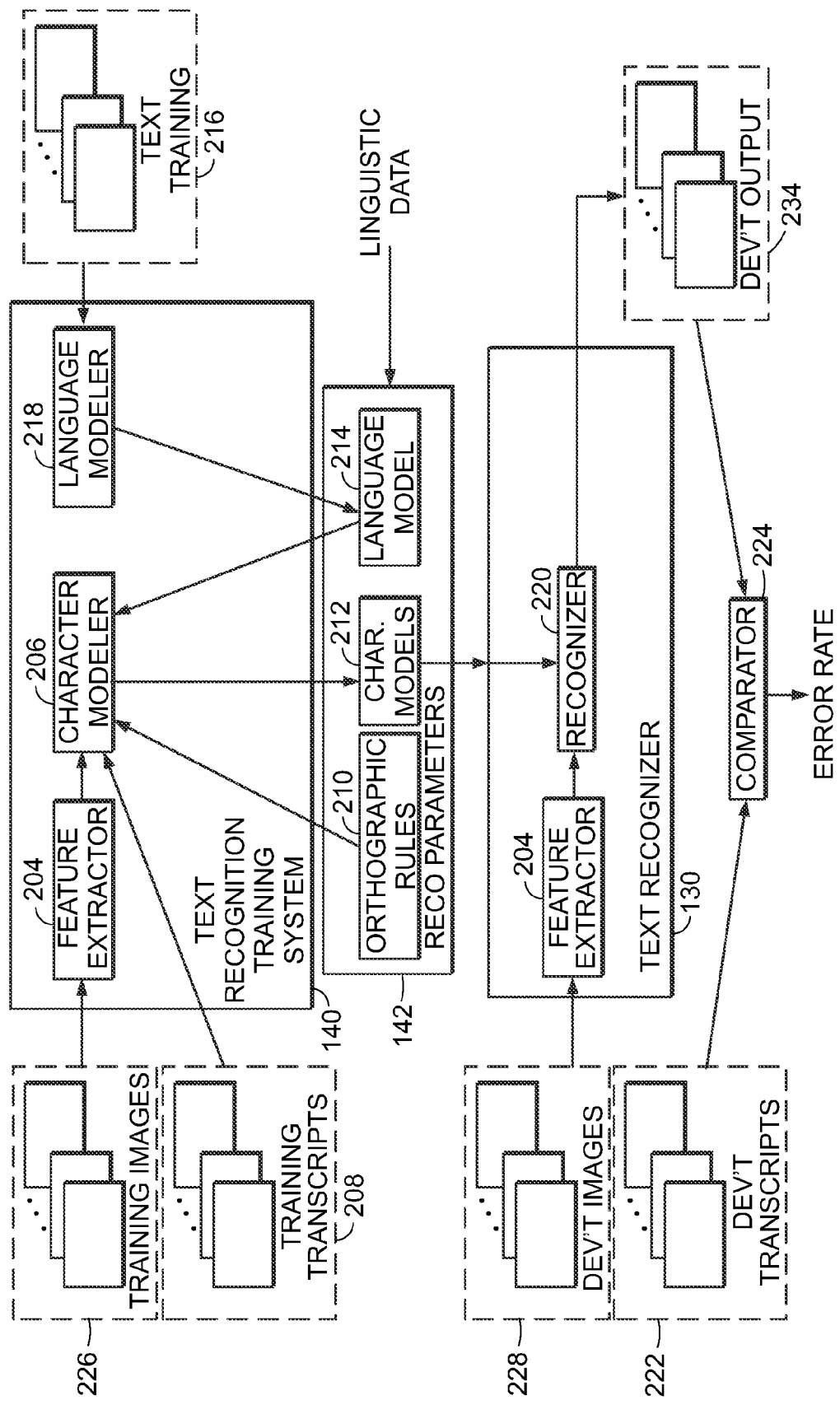
FIG. 2 is a text recognition and training system.

Referring to FIG. 2, the text recognition training system 140 processes a set of training images 226 and a corresponding set of training transcriptions 208 to produce recognition parameters 142 to be used by the text recognizer 130, for example, for processing the binary images 108, 128 shown in FIG. 1 to generate text hypotheses 114. Generally, the text recognizer 130 is expected to provide higher accuracy when the training images 226 are representative of the unknown images to be processed by the recognizer. Recall that in the system shown in FIG. 1, the binary images 108, 228 that are provided as input to the text recognizer 130 are the product of various different processors 106, 126. Therefore, the training system 140 is used to generate multiple sets of recognition parameters 142 associated with different processing streams. In each use of the training system, a different set of training images 226 is used as input to the training system. In some examples, the training system is applied to each of a set of languages or scripts, thereby generating recognition parameters that are appropriate to those particular languages and scripts.

Continuing to refer to FIG. 2, training system 140 applies a feature extractor 204 to each image in the set of training images 226. In some examples, this feature extraction identifies the location of (e.g., the baselines and letter height) of one of more lines of text present in the image. The feature extractor 204 divides each line of text into a series uniform horizontal windows (which can be overlapping or non-overlapping) and computes a feature vector for each window such that each feature vector is a numerical representation of the text image within the window. In various examples of the system, the feature vector can include one or more of moments, line-based representations, Fourier descriptors, shape approximation, topological features, shape approximation, or other features. Example methods used by the feature extractor 204 include those described in P. Natarajan, et al., "Multilingual Machine Printed OCR," *International Journal Pattern Recognition and Artificial Intelligence, Special Issue on Hidden Markov Models in Vision*, pp. 43-63, 2001, or P. Natarajan, et al., "Multilingual Offline Handwriting Recognition," *Proceedings Summit on Arabic and Chinese Handwriting*, College Park, Md., 2006, which is incorporated by reference here.

For each of the set of training images 226, a character modeler 206 receives the sequence of feature vectors produced by the feature extractor 202 for that image and the training transcript 208 corresponding to that image, and processes the data to produce character models 212, for example, by applying an iterative parameter estimation algorithm, such as the Estimation Maximization (EM) algorithm. In some examples, the character models 212 are multi-state, left-to-right hidden Markov models (HMMs) whose parameters are estimated by the character modeler 206. Generally, each state of a character model (e.g., the HMM) has an associated output probability distribution over possible feature vectors provided by the feature extractor 204. The model topology (e.g., a number of states in the HMM, allowable transitions) can be optimized for each type of script used in the videotext OCR system 100.

Continuing to refer to FIG. 2, the recognition parameters 142 produced by the training system also include orthographic rules 210 and a language model 214, in addition to the estimated character models 212. In some examples, the language model 214 can include a lexicon as well as a statistical language model. The statistical language model can include a character or word n-gram language model (LM) estimated from training images 216, and/or from the training transcripts 208 or other available sources of text.

In some examples, for a particular processing stream, the training system is used to generate multiple sets of recognition parameters 142, each generated using a somewhat different configuration of the character modeler 206 or aspects of the parameters (e.g., the orthographic rules, number of states of the HMMs). Once multiple sets of parameters 142 have been determined by the training system 140, a development set of images 228 is processed by the text recognizer 130. A set of development transcripts 222 corresponds to the development images, and represents the "true text" or the correct character sequence of text in each of the development images. The text recognizer 130 processes each image using the same feature extractor 204 as applied to training images and uses the HMM based recognizer 220 to produce a corresponding development text output 234. For each set of recognition parameters, the development text output 234 and the development transcripts 222 are passed through a comparator 224, which computes an overall error rate. The recognition parameters 142 with the lowest error rate on the development set are used by the recognizer 130 to process the unknown images produced by the corresponding processing stream.

Referring back to FIG. 1, when processing the images 108, 128, for which the text is unknown, the text recognizer 130 extracts features as in the training phase, applies a set of recognition parameters 142 that matches the processing used to generate the input image to the recognizer 220, and produces the text hypothesis 114. In some examples, the text hypothesis includes score information related to a degree of match of the image to the text hypothesis.

In some examples, the recognizer 220 performs a two-pass search. The first pass uses a relatively simple language model (e.g., a statistical bigram model) to generate a lattice of characters or words. The second pass uses a more complex model (e.g., a trigram model) and, optionally, more detailed character HMMs to generate the text hypothesis 114, which, in various examples, can include a 1-best hypothesis, N-best hypotheses, or a lattice.

EXAMPLES

The following examples were performed using elements of the videotext OCR system 100, which are described above. A number of examples used video input that includes overlaid videotext. The input video included English Broadcast News videos, specifically, the TDT-2 corpus of CNN and ABC news broadcasts recorded in 1998 (see, e.g., C. Cieri, et al., "The TDT-2 Text and Speech Corpus," *Proceedings DARPA Broadcast News Workshop*, 1999). All text boundaries regions and text time intervals were annotated manually. Each text region consisted of a single line of text with possibly multiple words. A single transcription ground truth value was assigned to each text region. Approximately seven hours of video each from CNN and ABC was manually annotated. All text in the video was annotated except for the moving text crawler in the CNN videos.

The text density in CNN was significantly higher than in ABC: 6.6 text regions per frame versus 2.1 text regions per frame. The corpus therefore contained significantly more CNN text data. Specifically, for CNN 16,719 text regions were annotated for CNN and 5,567 text regions were annotated for ABC. A fair development set of 871 regions for CNN and 475 regions for ABC were removed and none of the regions in the development set were included in the training set.

Results are also presented on data provided by NIST as dry-run data for a 2005 videotext OCR evaluation. The NIST dry run test set is from the same source channels (CNN and ABC) as used in the fair development set, but the samples are taken from a different time period in 1998. In total, there were 537 text regions in this test set.

Example 1

In a first example, a training system 140 was used for training character models 212 on the entire training images 226, which consisted of 22K instances of overlaid text, each instance having a corresponding text interval of multiple frames of the video and a bounding region. For each instance of the overlaid text in the training corpus, five frames were selected from which training images 226 were formed for use by the training system. In this example, all the images were binarized (e.g., using a processor 106) using a threshold on pixel intensity. This threshold was chosen to be $80^{th}$ percentile for high intensity text and $20^{th}$ percentile for low intensity text. A trigram character LM was estimated (e.g., using language modeler 218) from the same training data. Including the punctuations and numerals, the language model 214 included a recognition lexicon consisted of 86 characters. Each character HMM had an associated 512 component Gaussian mixture modeling the output feature distribution of the feature vectors at each state. The results below are reported on a fair set of development images, which were not used to estimate the recognition parameters 142.

Table 1, below, shows results for this first example. The first row shows that the word error rate (WER) on the $5^{th}$ I-frame decoded with the models derived from the five uniformly-selected frames is 32.7%. Next, a combined (minimum) image (a "min-image") was generated using 15 uniformly selected I-frames for each instance of overlaid text in the test data. Decoding the min-image using the same models as used for recognizing the $5^{th}$ I-frame resulted in a WER of 32.2%, which is 0.5% absolute better than the WER on the $5^{th}$ I-frame.

A separate set of character HMMs were trained also on min-images formed in the training corpus. Next, the min-image in the test data was decoded using the models that were trained on the min-images. As seen in the last row of Table 1, the WER reduced to 32.0%, a 0.7% absolute reduction in WER over the $5^{th}$ I-frame.

TABLE 1

Improvements in WER on development set for using contrast enhanced text image.

| Frame(s) for Training | Frame for Recognition | % WER |
|---|---|---|
| 5 I-frames per region | $5^{th}$ I-frame | 32.7 |
| 5 I-frames per region | Min-image | 32.2 |
| Min-image | Min-image | 32.0 |

Example 2

The characteristics (e.g., contrast) of an instance of overlaid text can change significantly from one frame to another. These same characteristics can be important in recognizing text. As a result, the error rate and the type of errors can vary significantly across different frames. Therefore, experiments were performed to characterize the change in error rate from one frame to another by measuring the error rate associated with a single selected frame and comparing it with the error rate of the best recognition result picked from five, 15, and 25 uniformly-sampled I-frames. When recognition was performed on only one I-frame, the $5^{th}$ (or last) I-frame was selected for each instance of overlaid text.

The character HMM and character LM described in the first row of Table 1 were used to generate 1-best character sequences for the I-frames of a particular text region. Confidence scores for 1-best hypothesis for each frame instance was generated using consensus network transformation of character lattices (see, e.g., L. Mangu, et al., "Finding Consensus among Words: Lattice-Based Word Error Minimization," *Proceedings EUROSPEECH*, pp. 495-498, Budapest, 1999, which is incorporated here by reference) produced by the two-pass decoding technique (described earlier) used by the recognizer 220.

In Table 2, below, the "oracle" WER for selecting the best hypothesis from different I-frames for a particular instance of overlaid text is summarized. The results indicate that significant improvements in WER can be achieved by selecting the best hypothesis from even five instances of the text. The lower bound in error rates across 15 I-frames is less than two-thirds the error rate of a single-frame answer. Including more number of instances of the text into the oracle selection gives further reduction in the WER, however the improvements seem to saturate after 15 instances.

TABLE 2

Oracle WER on development set for selecting best hypothesis across multiple instances of a text region.

| Condition | % WER |
|---|---|
| Recognition on $5^{th}$ I-frame (Baseline) | 32.7 |
| Oracle for 1-best across 5 I-frames | 23.6 |
| Oracle for 1-best across 15 I-frames | 22.7 |
| Oracle WER for 1-best across 25 I-frames | 22.5 |

Example 3

In another set of experiments, a voting mechanism (i.e., the estimator 132) that combines text hypotheses from five I-frames was compared to combining hypotheses from 15 I-frames. The character HMM and character LM described in the first row of Table 1 were used to generate 1-best character sequences for the I-frames of a particular text region. Confidence scores for 1-best hypothesis for each frame instance were generated using a consensus network transformation of character lattices (see, e.g., L. Mangu, et al., "Finding Consensus among Words: Lattice-Based Word Error Minimization," *Proceedings EUROSPEECH*, pp. 495-498, Budapest, 1999) produced by the two-pass decoding technique (described earlier) used by the recognizer 130.

As shown in Table 3, below, applying a voting mechanism (e.g., a technique used by the estimator 132) on hypotheses from five I-frames results in a 6% relative improvement over the baseline result of using the output from a single frame instance. Combining 15 I-frames resulted in a further improvement and the overall reduction in WER is 8% relative to baseline.

TABLE 3

Improvements obtained using multi-frame hypotheses combination on development set.

| Condition | % WER |
|---|---|
| Recognition on $5^{th}$ I-frame (Baseline) | 32.7 |
| Recognition on Min-image | 32.0 |
| Hypothesis combination on 5 I-frames | 30.8 |
| Hypothesis combination on 15 I-frames | 30.2 |

Figure 3:
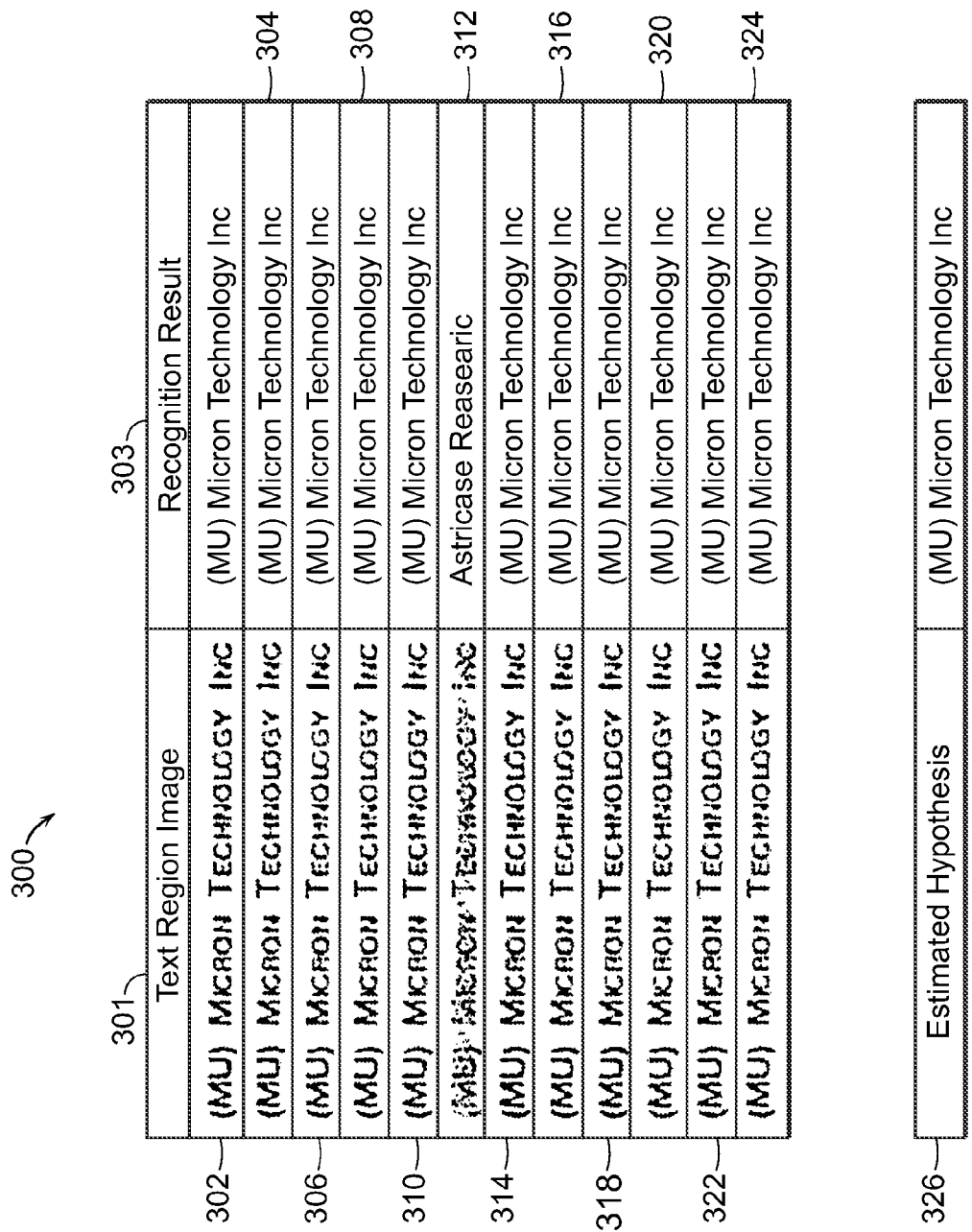
FIG. 3 is a table with example recognition results of combining multiple hypotheses.

In FIG. 3, the effectiveness of the hypotheses combination (e.g., as performed by the estimator 132) is demonstrated. As shown in table 300, an image of a text region appears in the left column and a text hypothesis for the corresponding text region image appears in the right column. Note that the error characteristics vary significantly across the different frames, primarily due to the different types of distortions of the overlaid text in each image. Although several instances, including the $5^{th}$ I-frame, contain errors, overall text output produced by the estimator 132 produces a recognition result with the correct answer.

Example 4

In another example, multiple sets of recognition parameters were trained, each corresponding to a different binarization threshold: 75, 80, and 85 percentile. Three sets of recognition parameters 142 were trained on the same five I-frame instances of an instance of overlaid text in the training data, in which each set used a binarization threshold (e.g., as set in processors 106) of $75^{th}$-, $80^{th}$-, or $85^{th}$-percentile intensity, respectively.

On the test images 226, instead of binarizing all 15 I-frames with a single threshold, an interleaved ordering was used for binarizing the same set of 15 I-frames. The first I-frame was binarized using a threshold of $75^{h}$-percentile intensity, the second instance at $80^{th}$-percentile intensity, the third at $85^{th}$-percentile intensity, the fourth at $75^{th}$-percentile intensity, and so on. Each binarized frame was decoded using recognition parameters trained using text images binarized using the matching threshold, that is, a frame binarized at $75^{th}$-percentile intensity is decoded using models trained using a $75^{th}$-percentile binarization threshold applied to the training images. Thus, the set of images decoded in the test set is the same as the 15-frame combination described in Examples 2 and 3 above, but 10 of the 15 frames are binarized at a threshold other than the $80^{th}$-percentile intensity and decoded with models trained with the matched binarization threshold ($75^{th}$- or $85^{th}$-percentile intensity).

As shown in Table 4, below, combining 15 I-frame hypotheses generated (e.g., using the text generator 130) using the multiple binarization strategy lowers the WER to 29.0%, a 1.2% absolute reduction in WER over combining hypotheses from the same 15 frames binarized at a single threshold and processed using a single set of character HMMs trained with the same threshold. Therefore, the multiple binarization strategy appears effective in capturing the variation in the characteristics of videotext across different frame instances.

TABLE 4

Improvements obtained using multi-frame hypotheses combination on development set.

| Condition | % WER |
|---|---|
| Recognition on $5^{th}$ I-frame (Baseline) | 32.7 |
| Recognition on Min-image | 32.0 |
| Hypothesis combination on 5 I-frames | 30.8 |
| Hypothesis combination on 15 I-frames (same binarization) | 30.2 |
| Hypothesis combination on 15 I-frames (3 sets of 5 I-frames binarized at 3 different thresholds) | 29.0 |
| Hypothesis combination on 18 frames (Above 15 I-frames + Min-image binarized at 3 different thresholds) | 27.2 |

Example 5

In Examples 1 and 3 above, the recognition performed on the contrast-enhanced image (min-image) was shown to produce a lower WER than the recognition performed on the $5^{th}$ I-frame. Although the WER reduction was modest, the results on the min-image have different error characteristics than those associated with regular I-frames. In this example, the min-image (e.g., the combined image 122) was incorporated into the hypotheses combination framework (e.g., the estimator 132). First, all min-images in the training corpus were binarized at three different binarization thresholds ($75^{th}$-, $80^{th}$-, or $85^{th}$-percentile intensity, e.g., using processors 126). Next, separate character models 212 were estimated from each of these different sets of binarized min-images. On the test data, the min-images were binarized at the same three binarization thresholds as in training. These binarized images were decoded with character HMMs trained using a matched binarization threshold. Finally, the three min-image hypotheses were added to the set of 15 I-frame hypotheses generated using different binarization thresholds and character HMMs. As listed in Table 4 above, performing hypotheses combination on this set of 18 hypotheses reduces the WER on the development set to 27.2%—a 17% relative improvement over the baseline WER of 32.7% obtained on the $5^{th}$ I-frame for each text region. This reduction in error rate is about 55% of the maximum reduction possible based on the oracle WER analysis in Table 2.

In some examples, the estimator 132 includes parameters that affect the combination of the text hypotheses. These parameters can include parameters for trading-off confidence scores of different character sequences used to form the network, a likelihood of a character, confidence scores for null arcs in the network, and the voting strategy (maximum confidence and average confidence). In this example, these parameters were optimized on the development set, and performance was compared on the validation set (NIST dry-run data). As shown in Table 5 below, the multi-frame combination strategy used with multiple binarization thresholds results in a 20% relative improvement over the baseline configuration of decoding the $5^{th}$ I-frame.

TABLE 5

Summary of improvements with multi-frame combination on NIST validation set.

| Condition | % WER |
|---|---|
| Recognition on $5^{th}$ I-frame (Baseline) | 31.2 |
| Hypotheses combination with multiple binarization of I-frames and min-image | 24.9 |

Implementations

In some implementations, a system includes an input for accepting the video input, and a user interface for providing the text output to a user. In some implementations, the text output is stored as data representing the overlaid or scene text in the image represented by input data for the video. For example, the text output is stored in association with the video, for example, in a database or in a meta data storage associated with the video.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A method for text recognition from a video signal comprising:
   forming a sequence of input images from the video signal, at least some of the input images including an image representing text;
   combining the sequence of input images to form one or more combined images;
   forming a plurality of processed images, including processing input images to form at least some of the processed images and processing the one or more combined images to form at least one of the processed images;
   generating one or more text hypotheses for each of the plurality of processed images; and
   determining a combined text output from a combination of the generated text hypotheses.

2. The method of claim 1 further comprising:
   accepting a sequence of video frames of the video signal; and
   accepting a specification of a bounding region and a time interface of an instance of text represented in the video signal, and forming a sequence of images from the video signal;
   wherein forming the sequence of images includes forming the images from the sequence of video frames according to the specification of the bounding region and the time interval.

3. The method of claim 1 wherein combining the sequence of images includes registering images from the sequence of images and combining the registered images.

4. The method of claim 1 wherein combining the sequence of images includes determining an extremum image.

5. The method of claim 4 wherein determining the extremum image comprises determining an extremum intensity value at locations over input images.

6. The method of claim 1 wherein forming the plurality of processed images includes forming binary images from the input images and the one or more combined images.

7. The method of claim 6 wherein forming a binary image from an input image comprises comparing intensity values at locations in the input image with a threshold intensity.

8. The method of claim 1 wherein forming the plurality of processed images includes, for each input image, forming a plurality of processed images, each of said processed images being formed using a different processing of the input image.

9. The method of claim 1 wherein generating the one or more text hypotheses for each of the plurality of processed images includes applying a statistical character recognizer to each of the processed images.

10. The method of claim 9 wherein forming the plurality of processed images includes, for each input image, forming a plurality of processed images, each of said processed images being formed using a different processing of the input image, and applying the statistical character recognizer to each of the processed images includes configuring the recognizer according to parameters matching the different processing applied to form the processed images.

11. The method of claim 1 wherein generating the one or more text hypotheses for each of the plurality of processed images includes generating multiple best character sequences.

12. The method of claim 1 wherein determining the combined text output includes aligning character sequence hypotheses of the generated text hypotheses.

13. The method of claim 12 wherein aligning the character sequences includes applying a spatial limit to the alignment of characters of different sequences.

14. The method of claim 1 wherein determining the combined text output from the combination of the generated text hypotheses includes forming a network representation of the text hypotheses and determining the combined text output using the network representation.

15. A method for text recognition from a video signal comprising:
   forming a sequence of input images from the video signal, at least some of the input images including an image representing text;
   combining the sequence of input images to form one or more combined images, wherein one of the combined images is an extremum image;
   forming a plurality of processed images, including processing input images to form at least some of the processed images and processing the one or more combined images to form at least one of the processed images;
   and including, for each input image, forming a plurality of processed images, each of said processed images being formed using a different processing of the input image, and applying a statistical character recognizer to each of the processed image includes configuring the recognizer according to parameters matching the different processing applied to form the processed images;
   generating one or more text hypotheses for each of the plurality of processed images; and
   determining a combined text output from a combination of the generated text hypotheses by forming a network representation of the text hypotheses and determining the combined text output using the network representation.

16. A system for text recognition from a video signal, the system comprising:
   an image combiner configured to accept a sequence of input images and provide a combined image formed from the input images;
   an image processor block, configured to accept the sequence of input images from the video signal and to accept the combined image from the image combiner;
   a text recognizer coupled to the image processor block for generating one or more text hypotheses for each of a plurality of processed images; and
   an output estimator coupled to the text recognizer for determining a combined text output from a combination of the generated text hypotheses.

17. The system of claim 16 wherein the image combiner is configured to accept a sequence of input images and provide an extremum image that has extremum intensity values at locations over the input images.

18. The system of claim 16 wherein the output estimator is coupled to the text recognizer for determining a combined text output from a combination of the generated text hypotheses by forming a network representation of the text hypotheses and determining the combined text output using the network representation.

19. A non-transitory computer-readable medium comprising instructions for causing a data processing system to:
   form a sequence of input images from a video signal, at least some of the input images including an image representing text;
   combine the sequence of input images to form one or more combined images;
   form a plurality of processed images, including processing input images to form at least some of the processed images and processing the one or more combined images to form at least one of the processed images;
   generate one or more text hypotheses for each of a plurality of processed images; and
   determine a combined text output from a combination of the generated text hypotheses.

20. The non-transitory computer-readable medium of claim 19, further comprising instructions for causing a data processing system to:
   combine the sequence of input images to form one or more combined images, wherein one of the combined images is an extremum image that has extremum intensity values at locations over the input images;
   form a plurality of processed images, including processing input images to form at least some of the processed images and processing the one or more combined images to form at least one of the processed images;
   and including, for each input image, forming a plurality of processed images, each of said processed images being formed using a different processing of the input image, and applying a statistical character recognizer to each of the processed image includes configuring the recognizer according to parameters matching the different processing applied to form the processed images; and
   determine a combined text output from a combination of the generated text hypotheses by forming a network representation of the text hypotheses and determining the combined text output using the network representation.

* * * * *